B. C. Galvin.
Portable Switch.
Nº 72184        Patented Dec. 17, 1867.
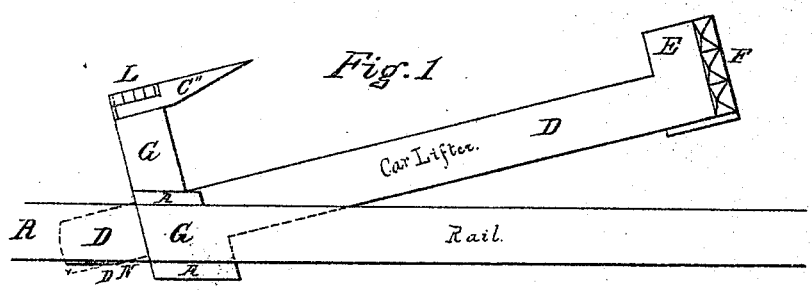
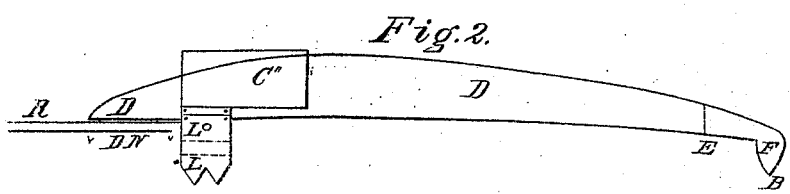
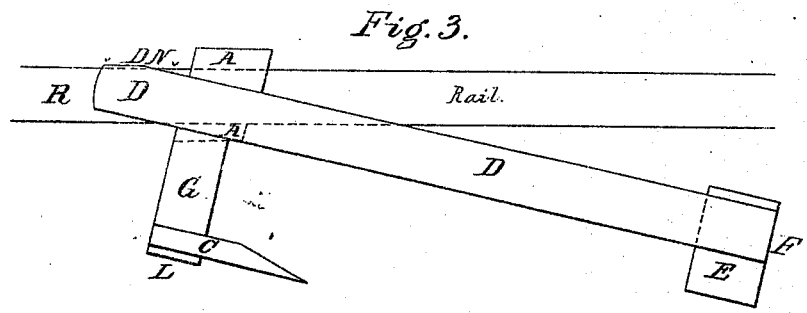
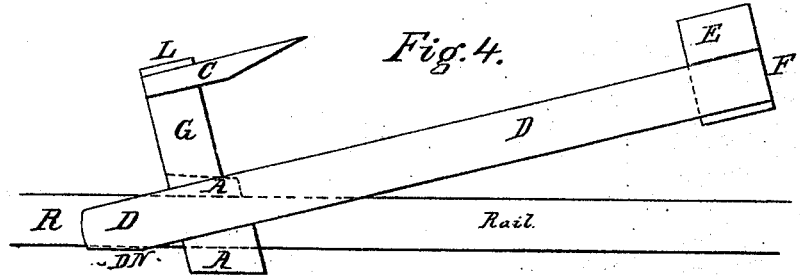
Witnesses.
Inventor.

B. C. Galvin.
Portable Switch.
№ 72184        Patented Dec. 17, 1867.
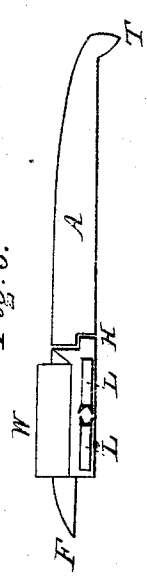
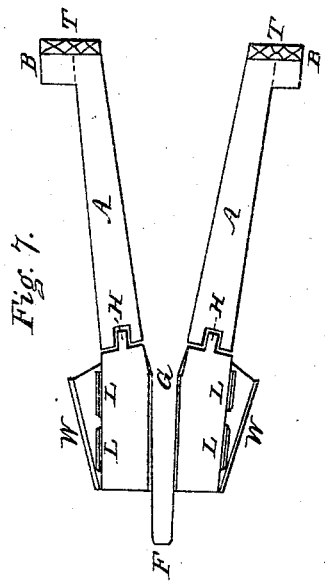
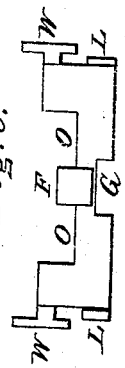
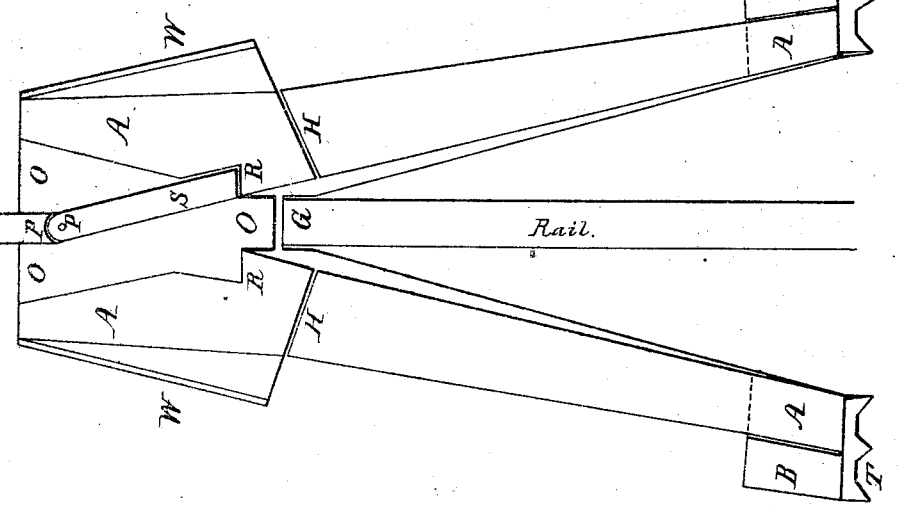
Witnesses.        Inventor.

B. C. Galvin.
Portable Switch.
Nº 72184. Patented Dec. 17, 1867.

Witnesses. Inventor.

United States Patent Office.

BARTHOLOMEW CLIFFORD GALVIN, OF NEW YORK, N. Y.

Letters Patent No. 72,184, dated December 17, 1867.

---

IMPROVED PORTABLE SWITCH.

---

*The Schedule referred to in these Letters Patent and making part of the same.*

---

TO ALL WHOM IT MAY CONCERN:

Be it known that I, BARTHOLOMEW CLIFFORD GALVIN, of the city of New York, in the State of New York, have invented a new and useful Portable Switch and Railway-Car Lifter combined; and I do hereby declare that the following is a full and exact description of the construction of the same and its operation, reference being had to the annexed drawings respectively, making a part of this specification, in which, in—

Figure 1, sheet 1, is a view of the under side of my invention.

Figure 2 is a side view of invention.

Figures 3 and 4 are plan views of the upper side of invention, when operating on the right and left-hand rails of a railway-track respectively.

Figure 5 is a plan view of my invention, shown in 3 and 4, combined in one portable form, and on the same principle as shown in 3 and 4.

Figure 6 is a side view of fig. 5.

Figure 7 is an under view of fig. 5.

Figure 8 is a sectional view of the front end of fig. 5.

Figure 9:
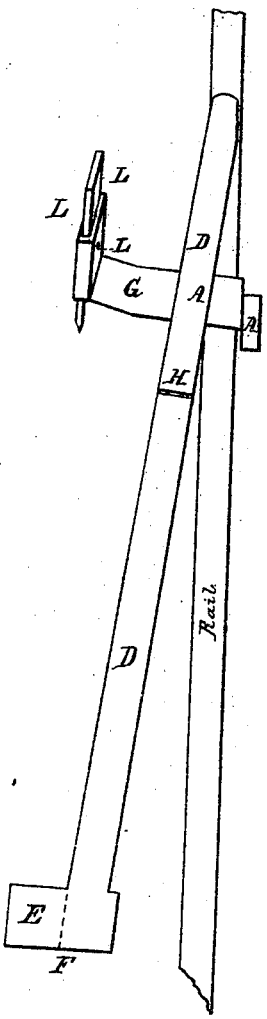
Figure 9 is a plan view of invention, as a single car-lifter combining the hinge in fig. 5, and a sliding levelling-attachment and plug working perpendicularly in a casing.

My invention, as shown in drawings, is made of wrought iron, and that part of it in figs. 1, 2, 3, and 4, lettered D D, consists of an iron bar, of from fourteen to thirty-two inches long, of sufficient strength and breadth on its upper side to enable a railway-car wheel to travel on it as a switch. This bar D is arched on its upper and under sides; and the former affords, from each of its ends to its centre, two inclined planes, and has also the inner edge of the surface of said inclined planes lower than the outside edge thereof, so as to incline the flange of the car-wheel, (when ascending the bar,) to its outside extremity D N, which latter rests on the iron rail R, when the switch is in operation, as shown in drawings 3, 4, and 9, respectively. G G are two iron plates, riveted together through the turned-down ends of each plate. One of these plates is inlaid and riveted to the under side of the bar D, and rests on the rail when the switch is in operation, and the ends of which plate, G G, being turned down, form the clip of the rail A A, which clip encloses the rail firmly, and on the outside of the rail is formed as iron teeth to hold between the rail and the ground outside during the operation of the switch. That part of invention in said figs. 3 and 4, lettered G, and which extends beyond the clip of the rail, has its end H turned down, and rests on that end outside the rail; and in fig. 9 is turned down and outwards at right angles with the rail, and the support thus afforded to that end of invention acts as a balancing power to the pressure of the car-wheel on bar D, figs. 3 and 4, and bar A, fig. 9, when passing over same at that end of invention. L is a levelling-attachment or lug to the end of letter G, and is used for the purpose of raising and supporting on the track that end of the switch, when the ground outside the track is hollow or uneven. C is an iron plate, strongly riveted on the top of the end of H. It is obliquely-shaped on the inner side from end to end, and is of sufficient height above the upper level of the bar D to guide and force the outside of a car-wheel, (when descending bar D,) on to the iron track, as required. E is an iron plate, attached to the end F of bar D, and with the aid of the iron teeth, letter F, forming that end of bar D, acts as a balancing power to keep the switch immovable while the car-wheel ascends it.

These devices are applicable alike to city railways or heavy locomotives and cars, requiring only to be varied in size.

Fig. 5 shows a combination of the preceding, in a portable form.

In fig. 5, A A are two iron bars, of sufficient depth and breadth to elevate and sustain a car to the level of a rail, and form a right and left-hand car-lifter, combined in one instrument, and applicable to the rails of a railway-track. B shows a balancing-attachment plate to the end of the arm A, and adjacent to the ground-teeth F, which latter are forced into the ground by the pressure of the wheel, and thereby render that end of the switch immovable during its operation. Each of the iron arms, lettered A A, is divided into two parts, which latter are hinged in each other at letter H, to enable the longer extremities of each arm to be depressed to any hollow ground outside of and adjacent to the rail, and in which the wheel of the car may be, without disturbing the body of the invention which rests on the rail. The upper sides of these two arms A A form inclined planes from both of their extremities, to the hinge H separating each, and the surfaces of such inclined planes are sloped or inclined from the outside to the inner side of each arm, so as to incline the flange of the car-wheel to the opening, letter O, over the groove G, and along the top of the switch S, and of the frog F to the inside of the rail on which the invention rests when in operation. The under sides of the arms A A are inlaid with and riveted to the iron plate O O, in the centre of which plate the groove G is formed to fit on the top of the rail, on which the invention rests when in operation.

In fig. 5, R shows a recess formed in each of the arms, letters A A, to receive one end of the switch S. The other end of letter S pivots at letter P within the end of the frog F, which latter is at that end hollowed out to support S; and the switch S has a lateral motion to either side of the arms A A, as required for switching purposes, and affords on its upper side a railway-track, continuous with the arm A A from the recess R in the arm A A on to the upper level of the frog F, which latter is made solid of iron or steel, and is riveted to and inlaid with the iron plate O O, and rests on and extends along the upper level of the railway-track, and by its inclined plane, from its point V to the switch S, completes the two inclined planes from each end of the arms A A to the hinge H H, O O, in figs. 5 and 8, respectively, show the iron plate connecting the arms A A, as also the sunken opening between them extending from above the groove G to both sides of the frog F, and of sufficient depth and breadth to enable the flange of the car-wheel to pass through it to the inside of the rail.

W, fig. 5, shows the wheel-guide iron plate, attached to the arms A A, constructed in the same manner as described with reference to figs. 1, 2, 3, and 4.

Figure 10:
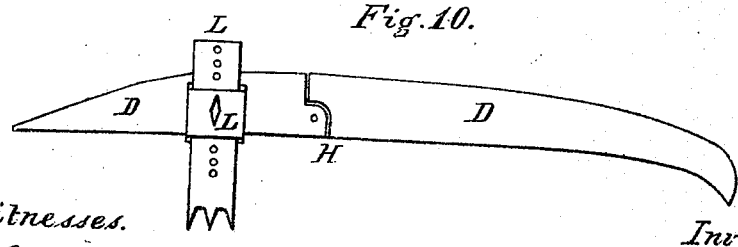
Figure 10 is a side view of fig. 9.

L L, fig. 6, shows the levelling-iron attachments or lugs to each side of the arms A A, and are intended to secure the even support of that end of the invention on the rail, when the ground outside, either side of the rail, is hollow or below the level of the base of the rail, and is similarly constructed as those referred to in figs. 3 and 4. The lug L L may be made in conjunction with figs. 3 and 5 to slide in a casing, and held by a pin-screw, the lug being perforated along its central line to allow the lug to be projected downward, to suit the inequalities of the ground's surface, as shown in drawing, figs. 10 and 11, and the hinge H, in fig. 5, may be also made applicable to the single switch, figs. 3 and 4, as shown in figs. 9 and 10.

Having thus described my invention, what I claim as new, and desire to secure by Letters Patent, is—

1. The single switch, constructed and arranged as described, with bar D, plate E, teeth F, clip of the rail A A, rail-plate G, wheel-guide C, and levelling-lug and casing L L, and vertical-acting hinge H in bar D, as and for the purpose set forth.

2. The double portable switch, when constructed with vertically hinged arms A A attached to plate O, with frog F and movable arm S working in notches R, with movable and sliding side lugs L L and parts B and W, all constructed and combined as and for the purpose set forth.

3. I claim, in the car-replacer or switch above described, the three inclines, combined and constructed substantially as described, and for the purposes set forth.

BARTHW. CLIFFORD GALVIN.

Witnesses:
H. CLAYTON,
JO. C. CLAYTON.